United States Patent [19]

Wagner et al.

[11] Patent Number: 4,815,364
[45] Date of Patent: Mar. 28, 1989

[54] REGISTER ASSEMBLY

[75] Inventors: Robert K. Wagner, Debarry; Alex L. Homery; Richard C. Asbury, both of Lake Mary; Allen W. Davis, Jr., Sanford, all of Fla.

[73] Assignee: Codisco, Inc., Sanford, Fla.

[21] Appl. No.: 22,940

[22] Filed: Mar. 6, 1987

[51] Int. Cl.⁴ .............................................. F24F 13/15
[52] U.S. Cl. ................................. 98/114; 98/40.27; 98/110; 403/402
[58] Field of Search ............... 98/40.27, 107, 110, 98/114, 121.2; 403/401, 402, 403

[56] References Cited

U.S. PATENT DOCUMENTS

| 2,447,347 | 8/1948 | Krantz . | |
|---|---|---|---|
| 2,607,972 | 8/1952 | Rust | 24/85 |
| 2,776,735 | 1/1957 | Bancroft . | |
| 2,804,952 | 9/1957 | Nothdurft . | |
| 3,196,895 | 7/1965 | Dayus | 98/110 X |
| 3,246,433 | 4/1966 | Eriksson | 52/98 |
| 3,627,359 | 12/1971 | Paul . | |
| 3,782,054 | 1/1974 | Goss, Jr. | 52/758 H |
| 3,996,845 | 12/1976 | Harris | 98/110 X |
| 4,024,691 | 5/1977 | Hansen et al. | 403/402 X |
| 4,103,601 | 8/1978 | Dayus | 98/110 |
| 4,105,348 | 8/1978 | Anderson et al. | 403/172 |
| 4,205,470 | 6/1980 | Kapnek | 403/402 X |
| 4,380,110 | 4/1983 | Harig | 29/525 |
| 4,579,375 | 4/1986 | Fischer et al. | 285/363 |
| 4,583,878 | 4/1986 | Madonia | 403/402 |

FOREIGN PATENT DOCUMENTS

| 567572 | 12/1958 | Canada | 403/402 |
|---|---|---|---|
| 195574 | 4/1965 | Sweden | 98/121.2 |
| 1377482 | 12/1974 | United Kingdom | 98/114 |

Primary Examiner—Harold Joyce
Attorney, Agent, or Firm—Duckworth, Allen, Dyer & Doppelt

[57] ABSTRACT

A register for an air duct is made up of extruded L-shaped members that have perpendicular integrally formed frame and duct inset parts locked in butting relationship at mitred ends by flat corner clips with resilient barbs that slip into and bitingly engage channels along the frame parts of adjacent members. End clips slip over the distal edges of the duct inset parts to secure the backs of adjoining members. Curved blades extend horizontally in louver fashion in front of pivotable vertical damper vanes across the register opening to provide airflow control.

10 Claims, 2 Drawing Sheets

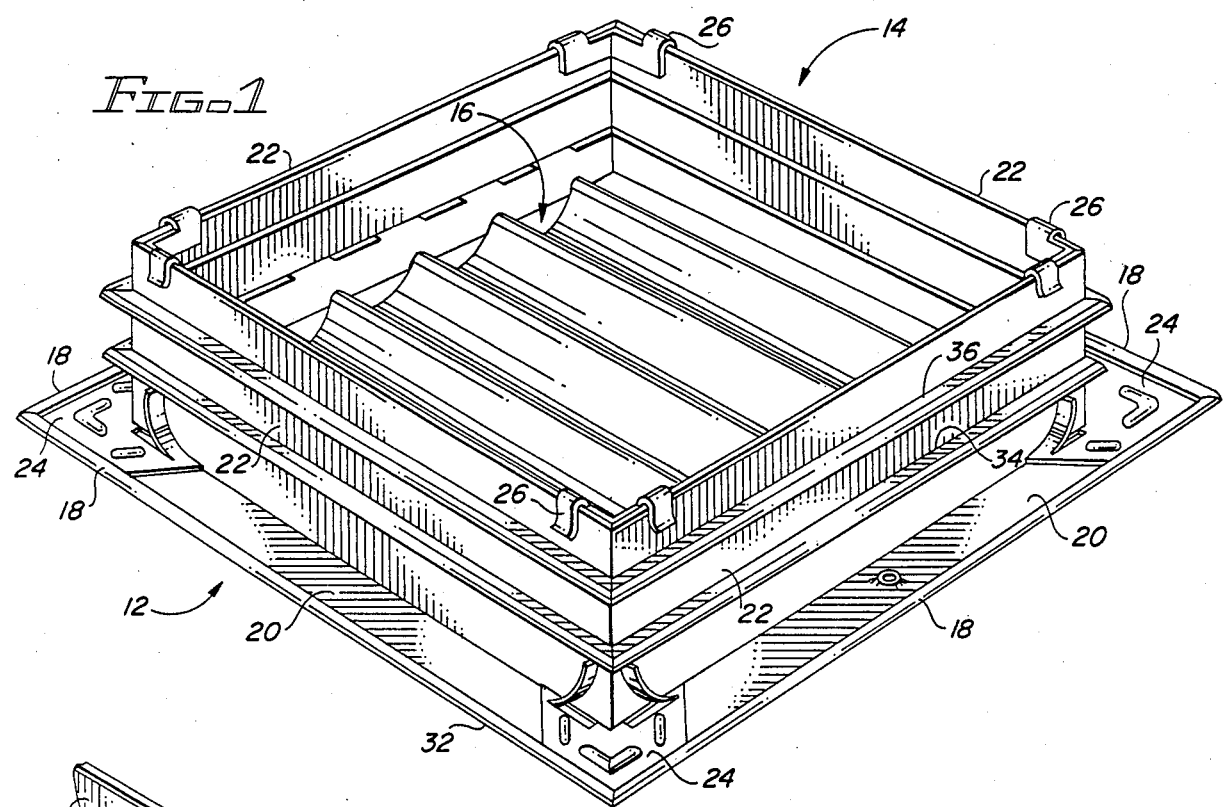
FIG-1
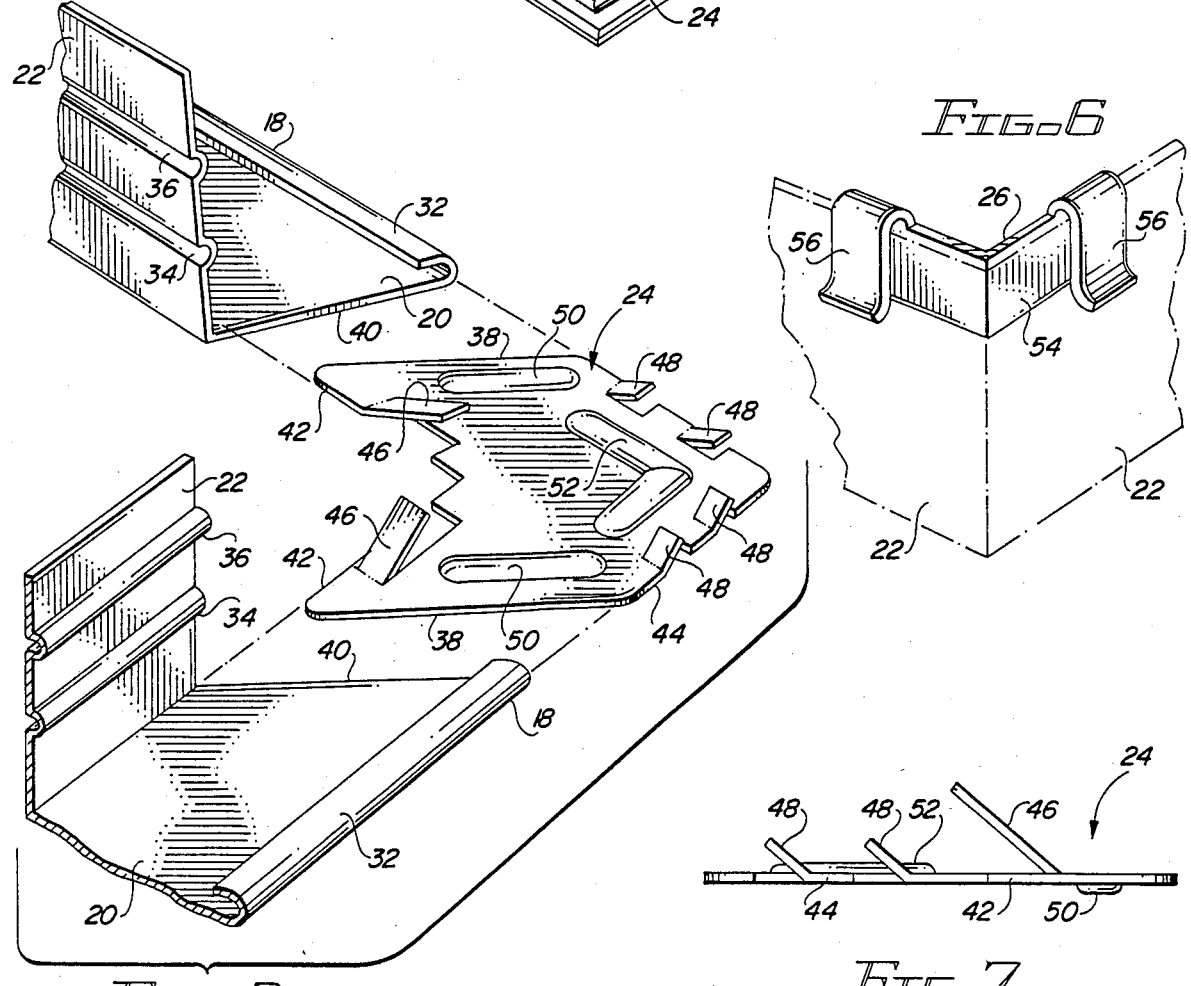
FIG-3
FIG-6
FIG-7

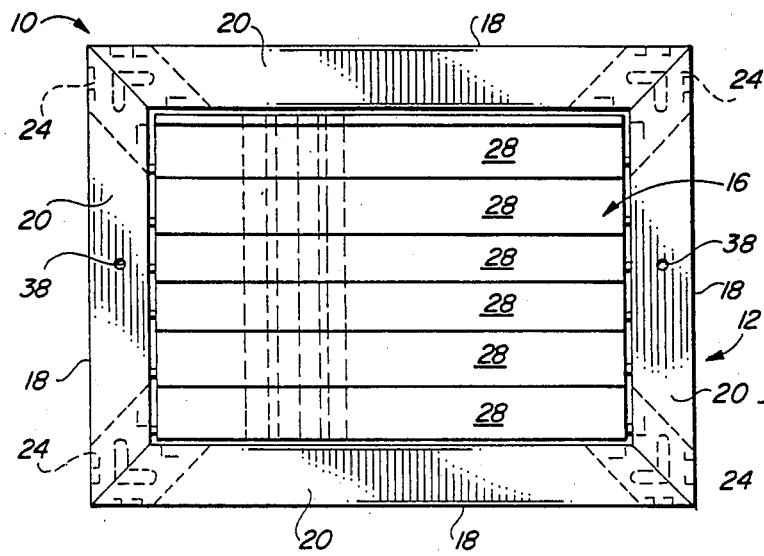
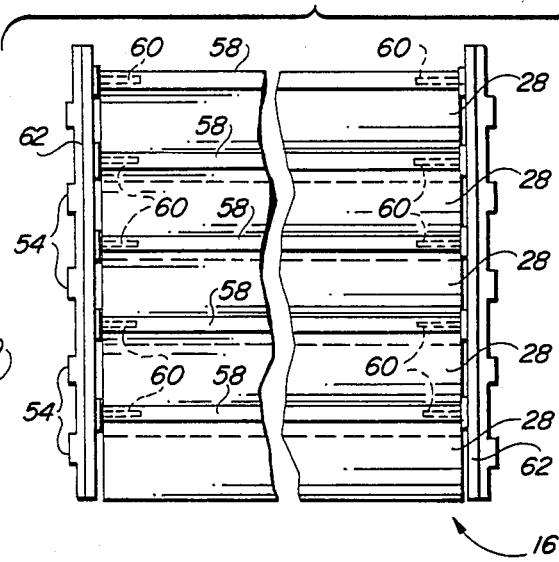
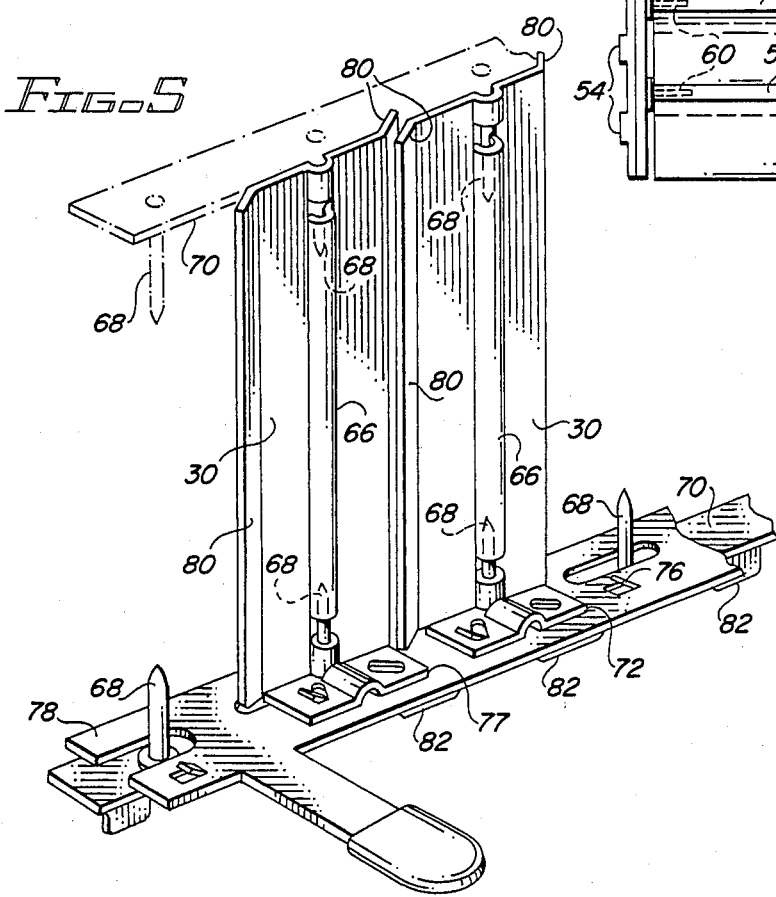

REGISTER ASSEMBLY

This invention relates to registers and grilles used to frame the openings and control the flow of air into and out of the ductwork of heating, cooling and ventilating systems.

BACKGROUND OF INVENTION

Registers and grilles are used to cover the openings onto living areas of air supply and return ducts of central and other heating, cooling and ventilating systems. They perform a beautification function by covering the duct opening and by concealing the rough finish around the hole cut in the wall, ceiling or floor to serve the duct. They also perform a flow control function by regulating and directing the flow of air to or from the duct.

Conventional registers of the type to which the present invention relates have frame, duct inset and flow control portions. The frame portion consists of a margin or border that surrounds the point of entry of the duct opening onto the living area and serves to provide an aesthetically pleasing transition surface which may be slightly rounded to provide a channel into which an insulation strip of foam tape or other material can be placed. The duct inset or box portion of the register leads back into the duct at right angle to the inner edges of the frame portion and serves as an interface between the frame and the duct. The frame and duct inset portions are generally rectangular and shaped to match the cross-section of the duct. The inset portion of the register is typically dimensioned to fit snuggly and concentrically within the duct channel, though sometimes an adapter is interposed (such as when a rectangular register is joined to a round duct). The frame portion extends perpendicularly to the duct central axis, and is positioned substantially flush with the wall or other living surface boundary onto which the duct opens.

The flow control portion of the register is comprised of one or more layers of vanes or blades which extend in louver or shutter fashion across the register opening defined by the facing inside surfaces of the frame and duct inset portions of the register. The blades may be fixed or movable. In a typical arrangement, a horizontal array of fixed blades is positioned ahead of a vertical array of movable blades; the fixed blades serving to deflect the air and the movable blades acting like damper vanes to permit movement from register open to register closed positions, with intermediate positions regulating the amount of air flow.

The terms "registers" and "grilles" are sometimes used interchangeably. Insofar as such structures are distinguishable, grilles tend to lack, or at least have greatly reduced, inset portions and are often used in places, such as at the air return of a residential central heating/air conditioning system, where the opening at the living area is smaller than the size of the adjoining air shaft or duct. The present invention has application to both registers and grilles. However, to avoid needless repetition, the term "register" will be used throughout with the understanding that, except where the context requires otherwise, the term "register" encompasses both registers and grilles.

A common form of prior art register construction utilizes a single piece of material for the frame. Rearwardly folding tabs provided at the insides of the frame serve for attachment of a separately formed duct inset portion. In another form of construction, the duct inset portion is provided with leading end portions that are bent outwardly at right angles for attachment to a single or multiple part frame portion. Vanes are typically firmly attached directly to the inside walls of the inset portion, or fitted for pivoting on end pins into corresponding holes in the inset. Other forms exist which provide connection between frame, duct inset and vane portions of registers in various other complex ways.

The manufacture and assembly of prior art registers requires many steps and is in many cases labor intensive. Different sizes and styles of registers for the same cross-sectional duct configuration require different processes. As assembly of the useable register often involves rigid connection of frame and duct inset pieces by means of rivets and other permanent connections, the registers are bulky in shipment and storage. Where register parts are put together by screws or similar threaded fasteners, original shipment bulk is reduced but tedious assembly labor is required by the distributor or end user.

SUMMARY OF THE INVENTION

It is an object of the present invention to overcome the above and other drawbacks of the prior art by providing a register assembly for use at duct wall openings of heating, cooling and ventilating systems that has a simple and versatile construction, capable of being easily manufactured and readily assembled.

In one aspect of the invention a register assembly is provided in which the frame portion of the register is defined by adjacent flat frame members which are butted together at their ends and secured by means which clip the frame members together in response to movement of the frame members toward each other.

In another aspect of the invention, a register is provided whose frame and duct inset portions are configured by integral L-shaped members that lock together in a simple manner, with few parts.

In another aspect of the invention a register assembly is provided whose frame and duct inset portions can be easily manufactured by extrusion, or similar means, relatively free of end use size restraints.

In a preferred embodiment, described in greater detail below, a register assembly for attachment at a rectangular duct opening has register members formed in a single extrusion process which are locked together at mitred ends by means of corner clips. The clips have resilient barbs which slide within channels integrally formed on the members to permit movement of adjacent ends of the members into butting relationship, but which bitingly engage the members to oppose disassembly. Each member presents a substantially flat frame part and a duct inset part set at right angle to the frame part. Register size is determined by the length to which the members are cut. Air flow control is provided by blades received in supports that are mounted along channels integrally formed on the member.

BRIEF DESCRIPTION OF THE DRAWINGS

Embodiments of the invention have been chosen for purposes of illustration and description, and are shown in the accompanying drawings, wherein:

FIG. 1 is a perspective view, with the vertical blade array removed, of the back of a register assembly formed in accordance with the present invention;

FIG. 2 is a front plan view of the register assembly of FIG. 1;

FIG. 3 is an exploded perspective view of the corner locking arrangement of the assembly of FIG. 1;

FIG. 4 is a front plan view of the horizontal blade array of the assembly of FIG. 1;

FIG. 5 is a partial perspective view, with portions removed, of the vertical blade array of the assembly of FIG. 1;

FIG. 6 is a perspective view of the end clip of the assembly of FIG. 1; and

FIG. 7 is a side elevation view of a corner clip.

Throughout the drawings, like elements are referred to by like numerals.

DESCRIPTION OF THE PREFERRED EMBODIMENTS

As shown in FIGS. 1-2, a register assembly 10 formed in accordance with the principles of the present invention has a frame portion 12, a duct inset or box portion 14 and an air flow control or vane portion 16. The portions 12 and 14, are formed by butting together the mitred ends of L-shaped members 18, each of which has a substantially flat frame member part 20 formed along its inside length at right angle to a duct inset member part 22. The adjacent ends of members 18 are locked together at their frame parts 20 by clips 24 positioned at the corners of the underside of frame portion 12 and at their duct insert parts 22 by means of end clips 26 positioned over the rear corners of adjacent sections of the duct inset portion 14. The air flow control or vane portion 16 comprises an array of horizontally positioned vanes or blades 28 (FIGS. 1, 2 and 4) positioned ahead of an array of vertically positioned blades 30 and extending across the register opening defined by the facing inner surfaces of the members 18. For clarity of illustration, the array of blades 30 has been removed in FIG. 1.

The manner of connection of the butting edges of adjacent members 18 of the assembly 10 by means of corner clips 24 is shown in FIG. 3. The members 18 have identical L-shaped cross-sections and may be formed in the same extrusion process. The material of members 18 is chosen based on intended application. The lengths of the respective members 18 are selected in accordance with the size of register opening desired.

Each member 18 has a frame part 20 and a duct inset part 22 integrally formed with the frame part 20 at right angle along its inside length. Along its outer length, the rear of each frame part 20 has an inwardly turned outer ridge 32, and the members 18 are also formed in their duct inset parts 22 with lengthwise extending spaced grooves 34 and 36 (FIG. 3) which protrude along the outer surface of the parts 22 and define channels, whose function is described below, along the inside surface of the parts 22. The ridge 32 and outward projection of groove 34 of each member 18 serve to capture one end 38 of the corner clip 24 (see FIG. 3) adjacent an end 40 of the member 18. A perpendicularly extending other end 38 of the clip 24 is captured between the corresponding ridge 32 and outward projection of groove 34 of the end 40 of an adjacent member 18. The clip 24 is configured and the ends 40 of the members 18 are mitred to bring members 18 joined by the same clip 24 into butting relationship to form the corners of the frame portion 12 of the register assembly 10 (FIG. 2).

The inner edges 42 and outer edges 44 of the corner clip 24 (FIGS. 3 and 7) are formed, respectively, with inner and outer resilient barbs 46 and 48. The inner and outer barbs 46 and 48 are formed by cutouts in the material of clips 24 bent upwardly so that they angle outwardly toward the corner. The clips 24, shown in FIG. 3, may be a metal leaf spring type clip on which the barbs 46 and 48 function as springs to retain the clips 24 within the confines of the frame parts 20 of the members 18 defined by the inwardly directed ridges 32 and the outward projections of grooves 34. Depressions 50 formed adjacent the ends of the clips 24 (FIGS. 3 and 7) serve to raise the clip 24 away from the rear surface of frame part 20 of member 18, so that the barbs 46 and 48 engage snuggly in a spring-like fashion with the respective contacted surfaces of ridge 32 and groove 34. The clip 24 is also formed with an L-shaped rib 52 which runs parallel to and inwardly of the outer edges 44 of the clip 24. The rib 52 functions to provide a gripping surface during insertion of the clip 24 into its respective captured position within one of the members 18. The barbs 46 and 48 will yield downwardly during insertion of the clip 24, but will bitingly engage the contacted surfaces of the member 18 to oppose withdrawal of the clip 24 out of member 18. Thus, the barbs 46 and 48 serve to lock the clips 24 into the adjoining frame parts 20 of adjacent members 18, thereby maintaining the abutting relationship of those members.

The adjacent members 18 are held in relative fixed positions at the rear corners of the assembly 10 by means of end clips 26 (FIG. 6) which are inserted over the back edges of the adjacent duct inset parts 22 of abutting members 18. As shown in FIG. 6, each end clip 26 is formed by an angle bracket 54 which is placed flush against the inside surfaces of adjacent inset parts 22 at a rear corner. The bracket 54 is held in place by resilient gripping clasps 56, located at the ends of bracket 54, that fit over the ends of the inset parts 22 to hold clip 26 in place.

The grooves 34 and 36 function to provide the means for positioning the blade arrays 28 and 30 within the interior of the register inset or box portion 14 defined by the oppositely facing surfaces of the duct inset parts 22 of the joined members 18. As shown in FIGS. 1 and 4, curved blades 28 are positioned one above the other in partially overlapping relationship lengthwise across the opening of the register 10 throughout the extent thereof. Each blade 26 has an open-ended tubular top portion 58 into which a post 60 extends to support the blades 28 between two oppositely positioned blade retainers 62 (FIG. 4). The blade retainers 62 have outwardly projecting aligned spaced tabs 64 that respectively fit within the channels formed by grooves 34 on the inside of the inset parts of opposite members 18 of the register assembly 10. The retainers 62 are inserted into the channels of grooves 34 and held in position until the clip locks 24 are inserted and the members 18 are brought into their respective abutting assembled positions.

The blades 28, as shown in FIG. 2, appear in a horizontal array, positioned one above another, with their convex surfaces facing the living area toward which the register opens. Positioned behind the array of horizontal blades 28 is a vertical array of damper vane blades 30 (FIGS. 2 and 5). For clarity of presentation, only two blades 30 are shown in FIGS. 2 and 5. It is noted, however, that the vertical array of blades 30 includes a sufficient number of blades to completely fill the opening of register 10.

The blades 30 are damper vanes vertically disposed widthwise of the opening of register 10, as shown in FIG. 2. Each blade 30 is mounted by means of a central longitudinal tubular stem 66 on pairs of posts 68 which extend toward each other from oppositely positioned blade retainers 70 (FIG. 5). At one end, the blades 30 have bases 72 extending at right angle to the air control surfaces of vanes 30. The bases 72 have guide openings 74 which cooperate with guide pins 76 formed in an intermediate actuator slider 78 to provide pivotal movement of the blades 30 about their central axes in response to back-and-forth movement of the slider 68. The vertical part of the damper blades 30 is substantially flat, except for bent end flaps 80 which act as stops to bring adjacent blades 30 into air passage closing contact, as shown by the positions of the blades 30 in FIG. 5. The retainers 70 have tabs 82, similar to tabs 64 of retainers 62, for mounting the damper blade array onto the register 10. During assembly of the register 10, the tabs 82 are positioned within the facing channels of grooves 36 of opposite members 18. Blade retainers 62 of the horizontal blade array 28 are positioned in the grooves 34 of one opposite pair of members 18 and the retainers 70 are positioned in the grooves 36 of the other opposite pair of members 18, so that the arrays of blades 28 and 30 run perpendicularly to one another, as shown in FIG. 2; the blades 28 being arranged in louver configuration for pivoting about end pins 60 to direct the airflow downwardly, and the blades 30 serving as damper vanes to control the amount of airflow to pass through the duct opening.

The assembled register 10 is mounted to the wall or other living area surface to which the duct opening connects by means of screws or other fasteners connected through holes 88 (FIGS. 1 and 2). An extension arm 84 (FIG. 5) may advantageously be provided at the front of the slider 78. The arm 84 can extend above or below the blades 28 out to the front of the register 10 to permit convenient user-actuated angling of the blades 30 from in front of the register 10 by back-and-forth shifting of the arm 84 which causes blades 30 to pivot about the posts 68 under guidance of the pins 76 which project through the openings 74. A cap 86 of plastic or similar material provides a convenient finger gripping surface for arm 84.

The foregoing illustrates, by way of reference to a described exemplary register assembly 10, that the invention provides a simple, easy to manufacture, and readily assemblable structure. The assembly 10 is configured from identically cross-sectioned members 18, whose lengths are conveniently chosen to provide two members 18 serving as the top and bottom framing components and two members 18 serving as the left and right side framing components of a register of desired length and width. Because each register member 18 has integrally formed frame and duct inset parts 20 and 22, no elaborate connection between frame portion 12 and duct inset portion 14 of the register assembly 10 is necessary. The only connection necessary to configure the desired register assembly 10 is the insertion of a clip 24 at each corner of the register 10 after respectively abutting mitred edges 40 of adjacent members 18 to form the corners. The resilient barbs 46 and 48 of the corner clips 24 (FIG. 3) permit easy insertion of a clip 24 into captured relationship adjacent the frame parts 20 of each member 18. Each clip 24 is started manually in the channel formed by the frame part 20, ridge 32, and groove 34 of one member 18, then brought into the channel of an adjacent member 18, and pushed the rest of the way in by bringing the mitred edges of the two members 18 toward each other. The corner clip 24 is held in place by biting engagement of the barbs 46 and 48, respectively, with the contacted surfaces of the outer projection of grooves 34 and the ridge 32 which define the inner and outer upper boundaries of the channels. End clips 26 are placed over the rear edges of the duct inset parts 22 of adjacent members 18 at each corner at the back of the register assembly 10 (FIG. 1). Air flow control is provided conveniently by simple arrangements of blades 28 and 30 whose respective retainers 62 and 70 are received in grooves 34 and 36 of opposite pairs of members 18.

The identical and simple cross-sectional configuration of the members 18 permits their manufacture by extrusion of plastic, aluminum, steel or other extrudable material, depending on the choice of material for the register. Blades 28 and 30 can be fashioned of similar materials, with plastic being a preferred choice for the retainers 62 and 70. Extrusion offers the advantage that it is relatively independent of register length and width dimensional considerations, those dimensions being defined only after extrusion by the manner in which the extrusions is to be cut.

An assembled register can be disassembled for reuse of the same components in a different sized register, or for reconfiguration of the blade arrays, by pulling the corners of the assemblies apart after a ruler or other means is slipped over the barbs 46 and 48 to hold them down out of the biting engagement with the contacted surfaces of ridge 32 and groove 34 which secures them.

While the exemplary embodiment, shows the register assembly 10 in retangular configuration, it will be appreciated that the members 18 can be made and connected in accordance with the invention into other configurations. The cross-sectional shape of the members 18 can also be varied. For example, it will be appreciated that the flat shape of the frame part 20 of the members 18 may be slightly curved or formed into any one of a variety of molding configurations and still be flushly mounted to the living area surface to function as a frame for the surface air passage opening. A slightly curved shape may be desirable to provide more room for the insertion between the register frame 12 and the living area surface of a strip of foam tape (not shown) or other material to insulate and seal against air leakage that creates unsightly dust streaks.

It will be appreciated that the configuration of the corner clips 24 and end clips 26 may also be varied, while keeping the same benefits and advantages of the invention. The barbs 46 and 48 may, for example, be smaller or larger and the ends 38 of the clips 24 may be extended further into each frame part 20. The geometry of the depressions 50 and ribs 52 may be varied or, if desired, those elements can be deleted altogether. It will also be appreciated that the blade arrays, illustrated by the horizontal blades 28 and vertical blades 30, can be replaced with other flow control vanes, or with wholly or partially fixed blades or vanes.

Those skilled in the art to which the invention relates will appreciate that there are moreover various other substitutions and modifications that may be made to the register assembly 10, described above as an example embodiment of invention, without departing from the spirit and scope of the present invention as defined by the claims appended hereto.

What is claimed is:
1. A register assembly, comprising:
   first and second elongated L-shaped structural members, each having a frame part and a duct inset part integrally formed at substantially a right angle along the length of one longitudinal edge of said frame part, and having an inwardly directed ridge along the length of the other longitudinal edge thereof; said structural members having mitred ends and being dimensioned to define a register opening when one is butted together with the other at respective ends thereof; each said structural member being formed with a groove providing an inner channel and an outward protrusion along the length of said inset part at a distance above said frame part;

means carried by said inner channel of at least one of said structural members for controlling the flow of air through said register opening; and a substantially flat corner clip which has ends adapted to be respectively received in parallel along said frame parts within clip channels defined between said inset parts and said ridges of said structural members, the upper outer boundaries of said clip channels being configured by said ridges and the upper inner boundaries being configured by said outward protrusions; said corner clip being provided with a plurality of resilient inner and outer barbs, angled upwardly out toward the corner, that yield downwardly responsive to movement of said respective ends of said structural members toward each other to permit the clip to be received within said clip channels, but which bitingly engage said upper outer boundaries and upper inner boundaries to oppose withdrawal from said clip channels; said inner barbs extending upwardly against said inset parts and acting to maintain said respective member ends in abutment at both said frame and inset parts thereof; said clip further including depressions formed near the ends thereof to raise the clip up from said frame parts to assist insertion into said clip channels and impart a loaded spring-like action to said inner and outer barbs.

2. A register assembly as in claim 1, wherein said clip is formed with a raised rib on its outer surface to assist manual gripping during insertion into an removal from said clip channel.

3. A register assembly as in claim 1, further comprising end clip means for connecting said duct inset parts of said butted ends of said structural members together at the rear of said register assembly.

4. A register assembly as in claim 1, wherein said groove formed in each structural member is a first groove formed at a first distance above said frame part, and wherein said airflow control means comprises a plurality of blades and means for mounting said blades within said first groove of said first structural member.

5. A register assembly as in claim 4, further comprising a second groove formed in parallel with said first groove in each structural member at a second distance different from said first distance above said frame part, and wherein said airflow control means further comprises a plurality of damper vanes and means for mounting said vanes within said second groove of said second structural member.

6. A register assembly as in claim 5, wherein said second distance is greater than said first distance, wherein said damper vanes are positioned transversely to said blades, wherein said blade mounting means comprises a first retainer strip formed with tabs that fit within said first groove of said first structural member and means for pivotally mounting said blades to said first retainer strip, and wherein said vane mounting means comprises a second retainer strip formed with tabs that fit within said second groove of said second structural member and means for pivotally mounting said vanes to said second retainer strip.

7. A register assembly as in claim 6, wherein said second mounting means further comprises an actuator slider interposed between said vanes and said second retainer strip and cooperatively associated with said vanes to bring about pivotal movement of said vanes between register open and register closed positions in response to back-and-forth movement of said slider actuator.

8. A register assembly, comprising:

first, second, third and forth elongated L-shaped structural members, each having a frame part and a duct inset part integrally formed at a substantially right angle along the length of one longitudinal edge of said frame part, and having an inwardly directed ridge along the length of the other longitudinal edge thereof, said structural members having mitred ends and being dimensioned to define a register opening when each is butted together with another at respective ends thereof; each said structural member being formed with a first groove providing an inner channel and an outward protrusion along the length of said inset part at a first distance above said frame part;

means carried by said inner channel of at least one of said structural members for controlling the flow of air through said register opening; and four substantially flat corner clips adapted to be respectively received in parallel along said frame parts within clip channels defined between said inset parts and said ridges of said structural members, the upper outer boundaries of said clip channels being configured by said ridges and the upper inner boundaries being configured by said outward protrusions; each said corner clip being provided with a plurality of resilient inner and outer barbs, angled upwardly out toward the corner, that yield downwardly responsive to movement of said respective ends of said structural members toward each other to permit the clip to be received within said clip channels, but which respectively bitingly engage said upper outer boundaries and upper inner boundaries to oppose withdrawal from said clip channels; said inner barbs extending upwardly against said inset parts and acting to maintain said member ends in abutment at both said frame and inset parts thereof; and each said clip further including depressions formed near the ends thereof to raise the clip up from said frame parts to assist insertion into said clip channels and impart a loaded spring-like action to said inner and outer barbs.

9. A register assembly as in claim 8, further comprising four end clips for connecting said duct inset parts of said respective butted ends of said structural members together at the rear of said register assembly.

10. A register assembly as in claim 9, wherein each structural member is further formed with a second groove extending along the length of said duct inset part at a second distance above said frame part greater than said first distance, and wherein said airflow means comprises a plurality of curved blades and mounted to and extending between said first grooves of said first and third structural members and a plurality of damper vanes mounted to and extending between said second and fourth structural members.

* * * * *